United States Patent [19]

Congleton

[11] Patent Number: 5,085,571
[45] Date of Patent: Feb. 4, 1992

[54] MOLD CONTAINING AN ADJUSTABLE KEY
[75] Inventor: Wayne Congleton, Walnut, Calif.
[73] Assignee: Dolco Packaging Corporation, Sherman Oaks, Calif.
[21] Appl. No.: 449,657
[22] Filed: Dec. 11, 1989
[51] Int. Cl.[5] ................... B29C 43/40; B29C 51/32
[52] U.S. Cl. ................... 425/292; 264/154; 264/163; 425/298; 425/309; 425/395; 425/553
[58] Field of Search ............... 264/153, 154, 155, 156, 264/163; 425/292, 298, 296, 309, 394, 395, 817, DIG. 37, 553, 400, 414, 290, 398

[56] References Cited

U.S. PATENT DOCUMENTS

| 4,108,941 | 8/1978 | Kermoian | 264/154 |
| 4,281,546 | 8/1981 | Fraleigh | 264/153 |
| 4,304,747 | 12/1981 | Lake | 264/156 |
| 4,387,068 | 6/1983 | Llabres et al. | 264/155 |
| 4,446,088 | 5/1984 | Daines | 264/155 |
| 4,612,153 | 9/1986 | Mangla | 264/154 |
| 4,755,129 | 7/1988 | Baker et al. | 425/292 |
| 4,909,721 | 3/1990 | Warburton | 425/292 |

Primary Examiner—Jay H. Woo
Assistant Examiner—Khanh P. Nguyen
Attorney, Agent, or Firm—Nilsson, Robbins, Dalgarn, Berliner, Carson & Wurst

[57] ABSTRACT

A mold for forming a container from a sheet of deformable material has upper and lower mold parts with die surfaces in conforming relation to one another. Upper and lower keys, each having a shear surface, are mounted in said upper and lower mold parts, respectively, so that the shear surfaces confront each other to form an opening in the container as the mold parts close. At least one of said keys is mounted so that its shear surface pivots on a plane normal to the motion of the closure of the mold parts.

9 Claims, 7 Drawing Sheets

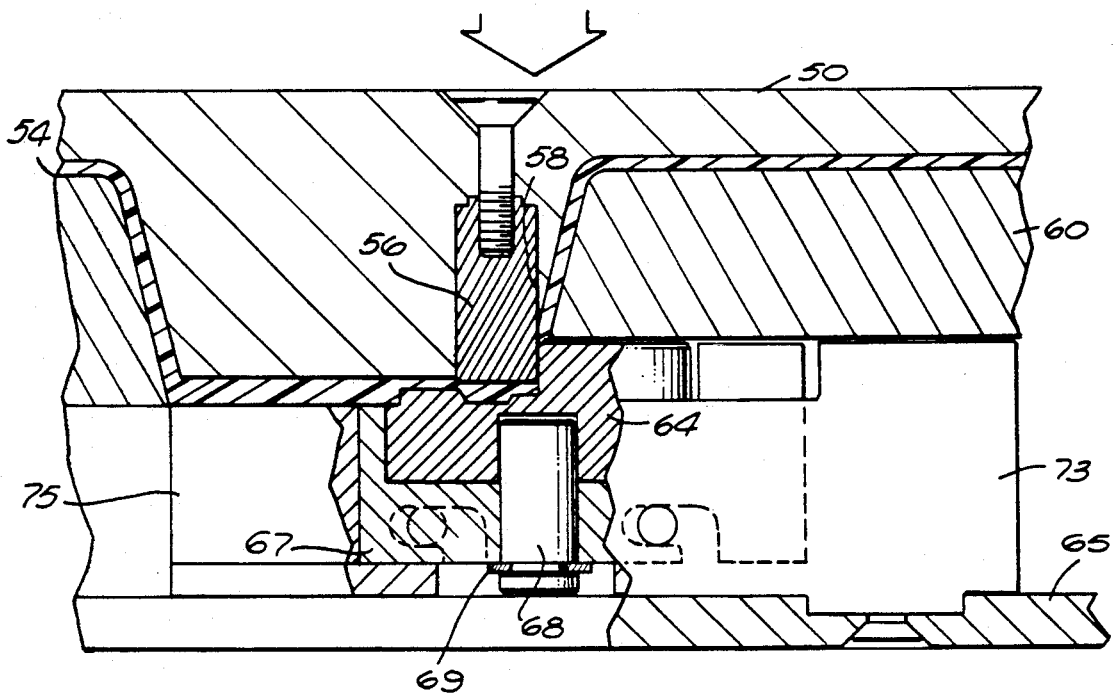
FIG. 3
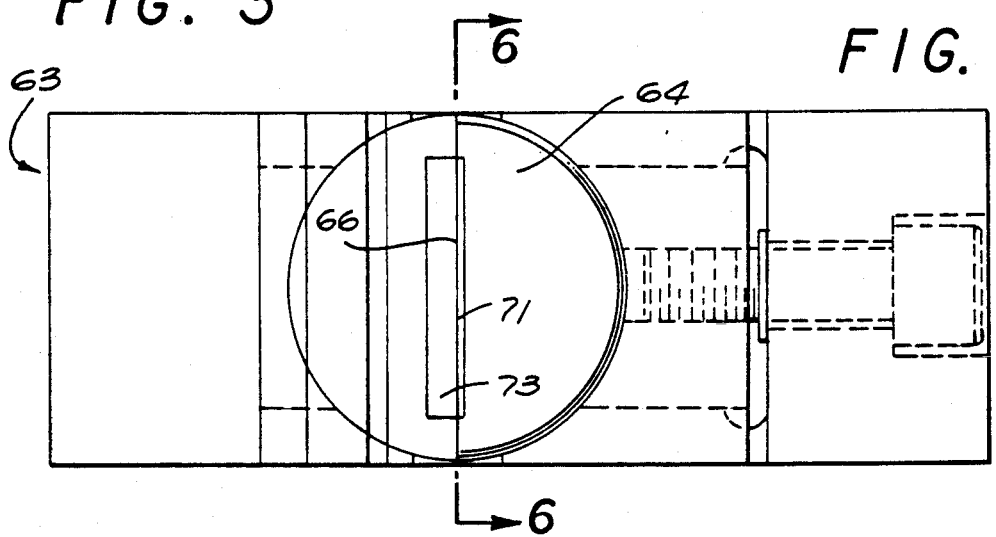
FIG. 4
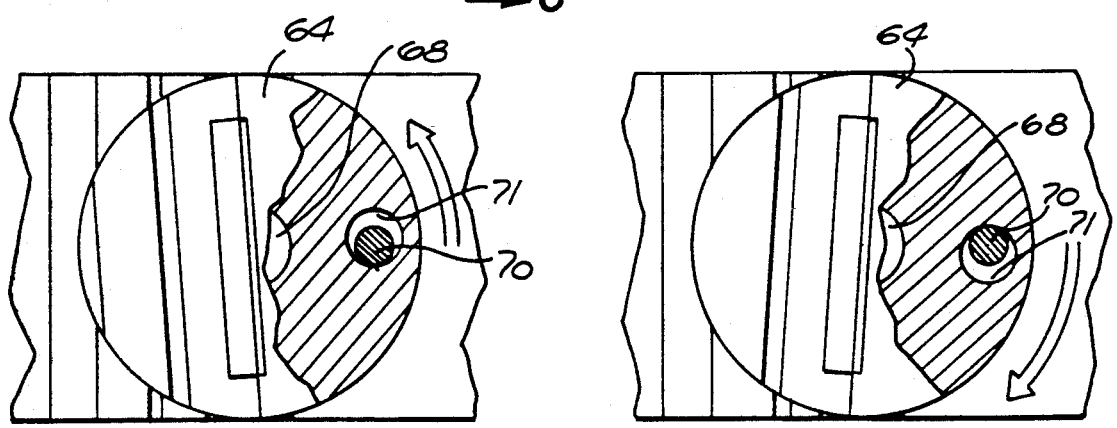
FIG. 4A
FIG. 4B

FIG. 7
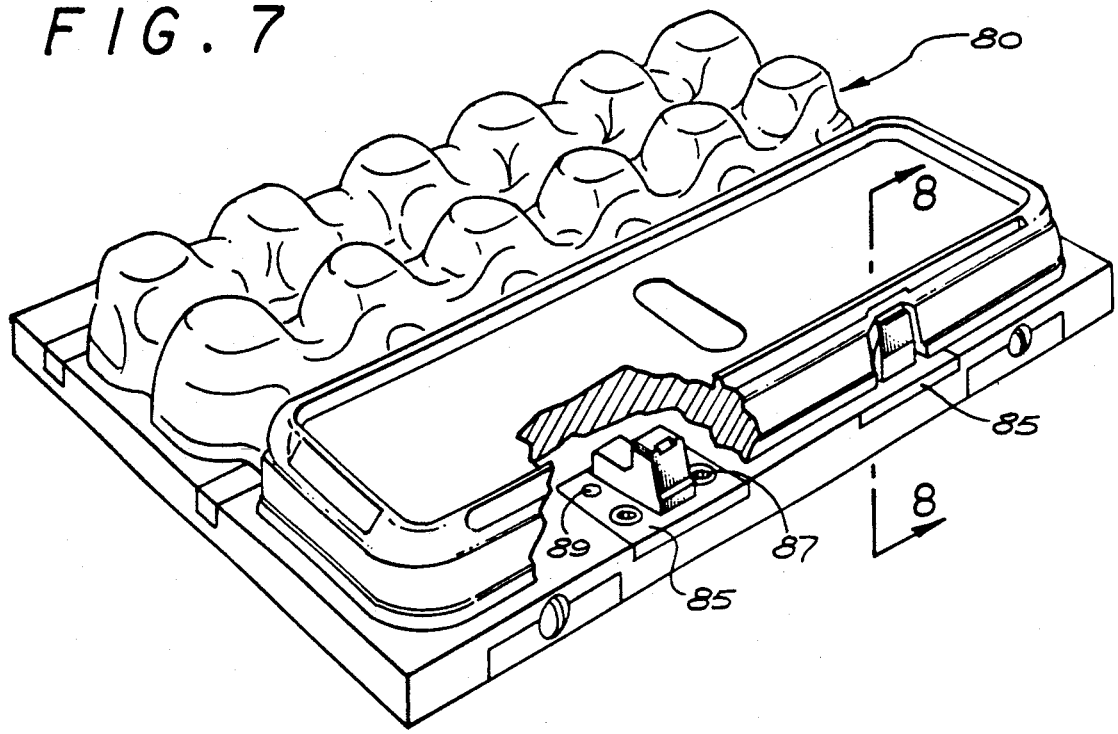
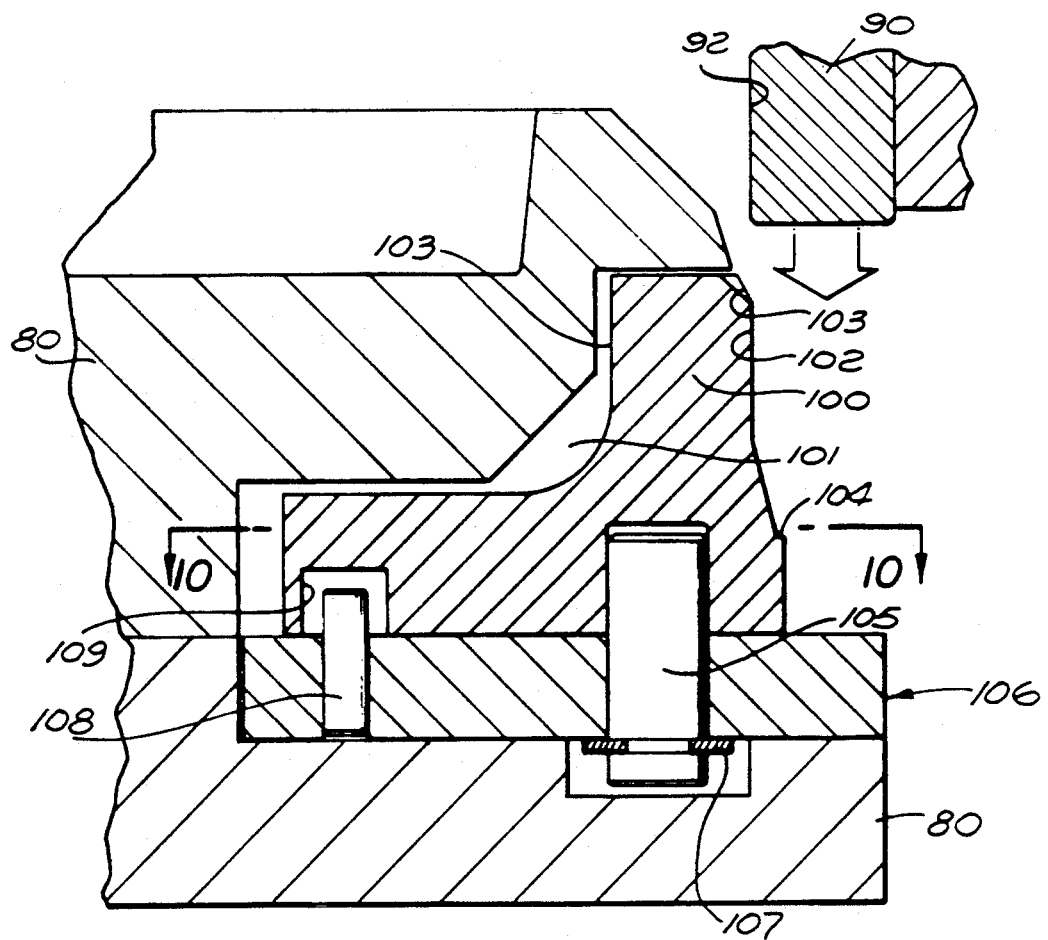
FIG. 8

MOLD CONTAINING AN ADJUSTABLE KEY

BACKGROUND OF THE INVENTION

1. Field of the Invention

The invention relates to the mechanical arts. In particular, it relates to a mold for forming a container with an opening, from a deformable material.

2. Description of Related Art

Molded plastic containers, more specifically, containers molded from expanded organic polymer material, are available in numerous shapes as packaging material for a variety of articles, such as eggs, take-out foods, light bulbs, seedlings and the like. The containers are particularly useful to protect the articles against impact, temperature changes and other adverse environmental effects. A large proportion of the containers are provided with closures which must withstand rough and rapid handling, or repeated opening and closing. A simple and effective closure is obtained by providing a latch, extending outwardly from or adjacent to one edge of one half of the container, which is insertable into a latch opening provided in the other half. The latch can be in the form of a flat tab or round protuberance, or the like. The latch can be provided in the bottom of the container and the latch opening provided in the lid, or vice versa.

U.S. Pat. No. 3,845,187 describes a continuous method for forming a container with an opening from a sheet of plastic. The opening is formed during the molding operation by obliquely and resiliently pressing a hole former through the plastic, until it contacts a die surface. Use of a spring or other resilient member to spring-load the hole former or the oblique surface serves to "tighten up" loose tolerances. However, limitations to this method arising from the design of the mold components and from the range of utility of the apparatus. The requirement that the hole former be in contact with the die surface, when it cuts through the plastic sheet, necessitates sharpening or replacement of its dulled or blunted cutting edge.

U.S. Pat. No. 4,108,941 describes a continuous method for forming a molded plastic container having an opening, where the opening is formed by the vertical shearing of a sheet during the closure of the mold parts. Shearing is accomplished by the movement of an upper key past a vertically aligned lower key, at a distance which is less than the thickness of the sheet, during compression of the mold parts.

U.S. Pat. No. 4,446,088 describes a mold for producing openings in thermoplastic cartons by the relative movement between a male key and a female key having flat surfaces transverse to the closing motion of the mold. The flat surfaces are biased into engagement with one another. To promote registration of the keys, as the mold closes, the female cutting edge engages a beveled edge on the male key against the bias in a motion transverse to the closing motion.

The mold in accordance with the present invention is an improvement upon the molds described in U.S. Pat. Nos. 3,845,187, 4,108,941 and 4,446,088, which patents are incorporated herein by reference. It has been discovered that, when in accordance with the invention, the mold incorporates a key which is pivotable along a plane normal to the direction of the closure of the mold parts, the alignment of the upper and lower keys is greatly facilitated. Moreover, once aligned, the keys stay aligned for longer periods of time than is possible with conventional molds. This increases the accuracy of the formation of the latch opening and reduces the frequency required for sharpening or replacing the keys.

The adjustable design of keys in accordance with this invention permits the mold to be used without spring-loading the components. However, particularly with very loose mold components, the components can be spring-loaded.

SUMMARY OF THE INVENTION

A mold for forming a container from a sheet of deformable material has upper and lower mold parts with die surfaces in conforming relation to one another, means for supporting the mold parts, spaced from one another a distance sufficient to permit insertion of the sheet between the mold parts, and means for closing the mold parts toward one another along a path of travel to form the container. The mold contains upper and lower keys mounted in the upper and lower mold parts, respectively, where the upper key and the lower key each have a shear surface and where the keys are mounted so that the shear surfaces confront each other to form an opening in the container as the mold parts close. When at least one of the keys is mounted so that its shear surface pivots on a plane normal to the motion of the closure of the mold parts, the alignment of the upper and lower keys is greatly facilitated and, once aligned, the keys stay aligned for longer periods of time than is possible with conventional molds.

BRIEF DESCRIPTION OF THE DRAWINGS

FIG. 3 is a cross-sectional view, partly cut away, showing the lower and upper keys and associated components of a mold for forming the container of FIG. 1, in a closed position.

FIG. 4 is a top plan view, taken along line 4—4 of FIG. 2, showing an adjustable key assembly in accordance with the invention.

FIGS. 4A and 4B are top plan views, partially cut-away, of a portion of FIG. 4, illustrating the two extremities of angular rotation of the adjustable key.

FIG. 7 is a perspective view, partly cut away, of a lower mold part of a mold for forming an egg-carton.

FIG. 8 is a cross-sectional view of a portion of FIG. 7, taken along line 8—8, and of a portion of an upper key.

DETAILED DESCRIPTION OF THE PREFERRED EMBODIMENTS

As required, detailed illustrative embodiments of the invention are disclosed herein. However, it is to be understood that the embodiments merely exemplify the invention which may take forms that are different from the specific illustrated embodiments disclosed. Therefore, specific structural and functional details are not to be interpreted as necessarily limiting, but as a basis for the claims which define the scope of the invention. For example, the invention will be illustrated with vertically shearing keys (keys having shear surfaces located in a plane parallel to the plane of the closing motion of the mold members), but the invention also has application to obliquely disposed keys.

Figure 1:
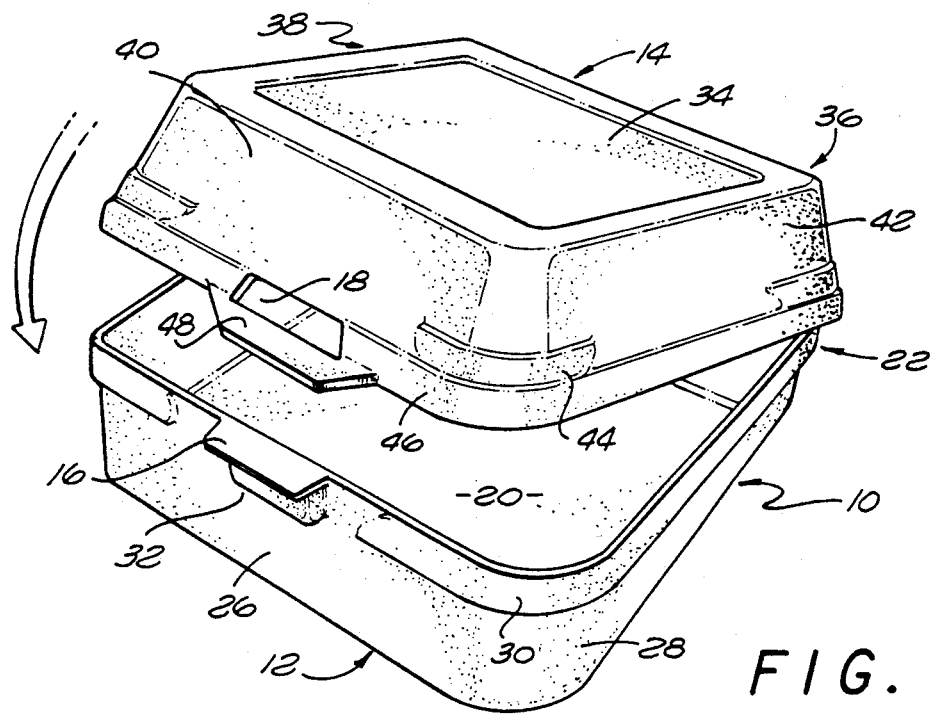
FIG. 1 is a perspective view of a food container, including an opening.

Referring to FIG. 1, there is shown a one-piece, semirigid food container 10 constructed to include two boxlike members 12 and 14, one of the members 12 serving as a bottom and the other member 14 serving as a lid therefor. The bottom 12, the lid 14 and a hinge (not shown) connecting the two are integrally molded as a unitary container.

The bottom 12 includes a generally rectangular base wall 20 with rounded corners and four side walls 22, 24, 26 and 28, respectively, which extend outwardly from the base wall in a tapering direction. The upper portions of the walls 24 and 28, and parts of the upper portions of walls 22 and 26 are reinforced by integrally molded convex trim bands 30. A latch tab 16 is disposed at the center of the wall 26, between proximate portions of the trim band 30 and extends horizontally outwardly therefrom. A projection 32 juts out from the wall 26 below the latch tab 16 and serves as a support for the latch tab as well as a stop limiting the distance by which the tab can be advanced through a latch opening 18.

The lid 14 includes a generally rectangular base wall 34 with rounded corners which is integrally molded with outwardly tapering side walls 36, 38, 40 and 42, respectively. The corners of the side walls are reinforced by integrally molded convex trim strips 44. An outwardly bulging flange 46, defining the outer edges of the walls 38, 40 and 42, is integrally molded therewith. The latch opening 18 which lies in the plane of wall 40 is formed at the center of the wall in the region of the flange 46. A latch ledge 48 which extends horizontally outward from the lower edge of the latch opening 18 is reinforced by accretion thereon of the material removed from the area of the latch opening.

Figure 2:
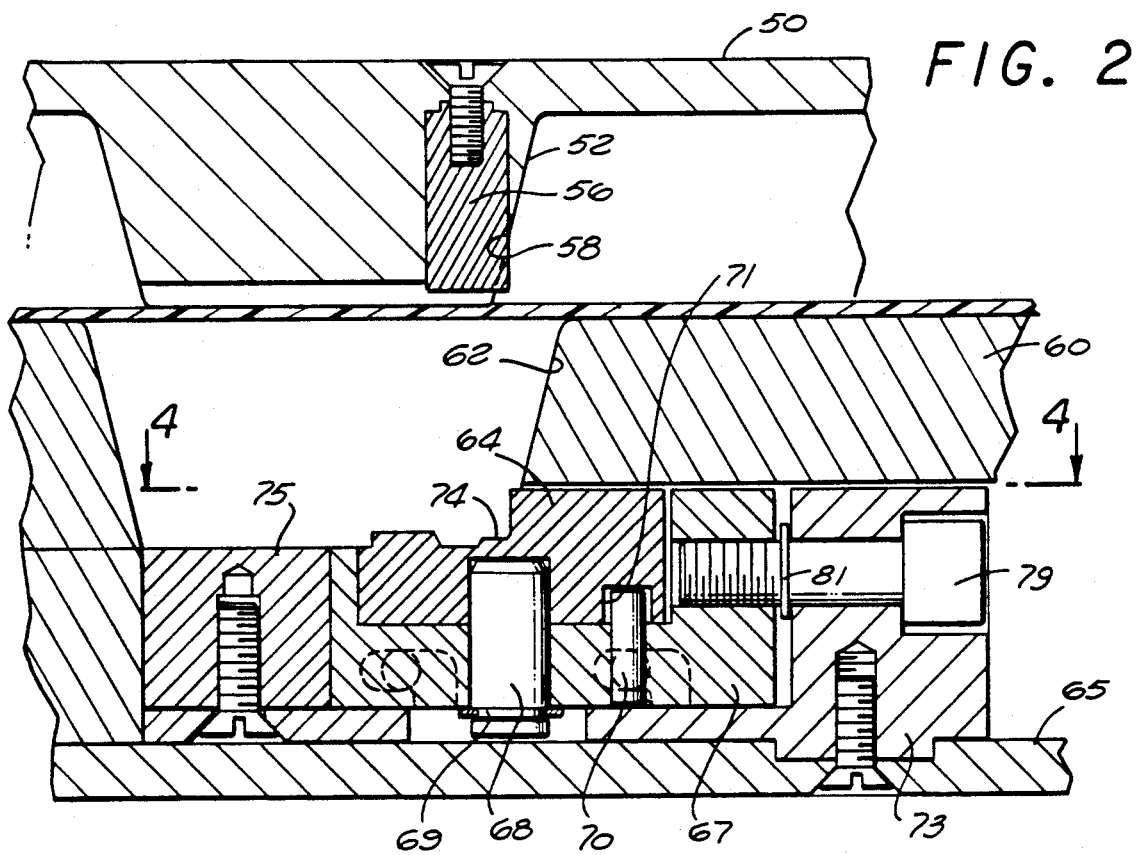
FIG. 2 is a cross-sectional view, partly cut away, showing the lower and upper keys and associated components of a mold for forming the container of FIG. 1, in an open position.

Referring now to FIG. 2, there is shown the lower and upper keys and associated components of a portion of a mold for thermoforming food containers. The portion is identical to a plurality of such portions in a bank of mold stations in tandem therewith in a direction into and traverse to a drawing sheet. The mold stations are arranged to form simultaneously a plurality of containers between their conforming surfaces.

The containers are molded from a sheet of a deformable material, such as an organic polymer material, preferably an expanded organic polymer material, such as expanded polyethylene. The choice of a particular deformable material depends, in part, on the kind of articles which are to be enclosed in the containers.

The portion illustrated in FIGS. 2 and 3 includes upper and lower mold parts 50 and 60, respectively, formed with confronting die surfaces 52 and 62. The confronting die surfaces 52 and 62 are shaped to contour a sheet 54 of deformable material inserted therebetween into the form of the container 10 shown in FIG. 1. Not shown, but well known in the pertinent art, are means for supporting the mold parts 50 and 60, spaced apart from one another a distance sufficient to permit insertion of the sheet 54 of deformable material and means for closing the mold parts toward one another along a path of travel to form the container 10.

In the portion shown in FIG. 2, the mold parts 50 and 60 and their die surfaces 52 and 62 define the contours of a latch tab-containing end of one container (shown upside down) side by side with the contours of a latch opening-containing end of a second container. The mold parts 50 and 60 are closed during molding and are opened to permit ejection of the cooled finished container and the subsequent insertion of new deformable sheet material, into the cavity defined by the die surfaces 52 and 62.

An upper key 56 having a rectilinear cross-section is releasably attached to the upper mold part 50. The upper key 56 has a flat shear surface 58, located in a plane parallel to the plane of the closing motion of the mold parts 50 and 60.

An adjustable lower key assembly 63 (FIG. 5) containing, a lower key 64, is attached to a lower mold base 65. The lower key 64 has a flat shear surface 66, also located in a plane parallel to the plane of the closing motion of the mold members 50 and 60.

Figure 5:
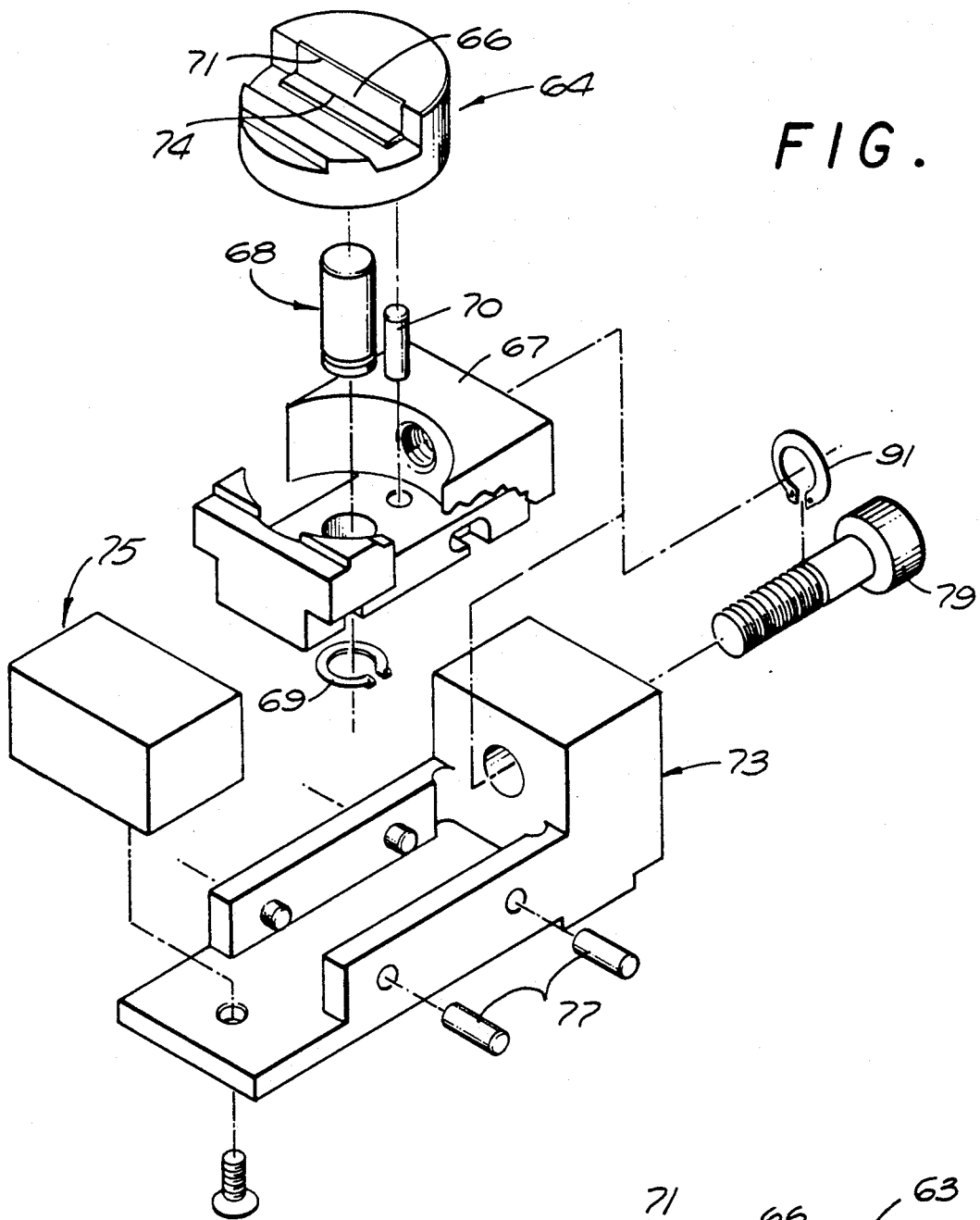
FIG. 5 is an exploded perspective view of the adjustable key assembly of FIG. 2.

Referring additionally to FIG. 5, the lower key assembly 63 includes a pivotable lower key 64. The lower key 64, which is cylindrical with top and bottom surfaces, is fitted into a complimentary cylindrical recess in a lower key carriage 67. The lower key 64 is attached to the lower key carriage 67 by a pivot pin 68. The pivot pin 68 is press fit into a bore in the center of the bottom of the lower key 64 and slip fit through a bore in the lower key carriage 67. It is secured to the lower key carriage 67 with a retaining clip 69.

Rotation of the lower key 64 with pivot pin 68 enables the lower key to pivot on a plane normal to the path of travel of the upper and lower mold parts. The range of angles about which the lower key 64 can pivot is predetermined. The range is constrained by a retainer pin 70, one end of which is press fit into a second bore in the bottom of the lower key carriage 67. The other end of the retainer pin 70 fits into a retainer pin slot in the bottom of the lower key 64.

The lower key carrier 67 is releasably attached to a carrier base 73 by four pins 77 which fit into complimentary slots in the lower key carrier. The adjustable key assembly 63 also contains means for positioning the lower key carrier 67 and the lower key 64, along a line transverse to the path of travel of the mold parts 50 and 60. In the embodiment shown in FIGS. 2 through 5, the location of the lower key 64 along a line transverse to the path of travel is adjusted using positioning bolt 79. Positioning bolt 79 is slidably fit through a bore in carrier base 73 and secured to the carrier base with a second retaining clip 81. The positioning bolt 79 is then threadably secured to the lower key carrier 67.

The embodiment shown in FIGS. 2, 3 and 5 also contains a spacer 75 abutting the lower key carriage 67 and releasable attached to the carrier base 73. The shape of the spacer is chosen so that the lower key assembly 63 is easily fit into the lower mold base 65.

Referring now to FIGS. 4 and 5, there is shown the lower key assembly 63. The pivotable lower key 64 has a flat shear surface 66. At the top of the shear surface 66 is a chamfered edge 72. At the bottom of the shear surface 66 is a die surface 74.

The chamfer on the edge of the shear surface 66 facilitates the alignment of the upper and lower keys during the molding process. The chamfer can be on the edge of the shear surface of the lower key as shown in FIGS. 4, 5 and 6, or it can be on the edge of the shear surface of the upper key or it can be on the edges of both keys.

The shear surface 66 and the chamfered edge 72 are projected outwardly from the conforming surface of the lower mold part in the region of the latch opening 18. The chamfered edge 72 forms a leading edge extending and adjacent the width of the latch opening. The portion of the shear surface 66 bounded by the chamfered edge 72 and the die surface 74 has the same dimensions as the latch opening 18.

Referring now to FIGS. 4A and 4B there is shown a partially cut away view of portions of the lower key assembly 63 illustrating the extremities of the angular adjustment. The extent to which the lower key 64 can rotate around pivot pin 68 is constrained by the retaining pin 70 and the retaining slot 71. In the embodiment shown in FIGS. 4A and 4B, the retaining pin 70 has a circular cross-section. The end of the retaining pin 70 is fit inside a retaining slot 71, the cross section of which is larger than the cross section of the retaining pin 70. Consequently, the lower key 64 is free to pivot only until the retaining pin 70 comes into contact with the edge of the retaining slot 71.

Figure 6:
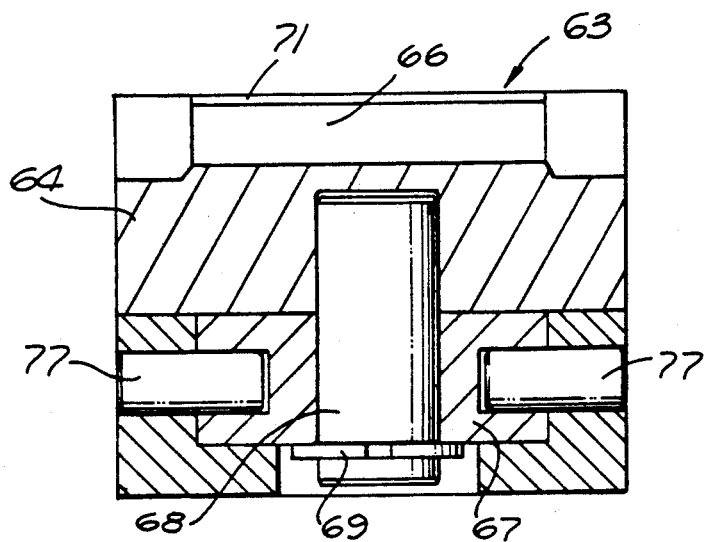
FIG. 6 is a cross-sectional view taken along line 6—6 of FIG. 4.

Referring now to FIG. 6, there is shown a cross-section of the lower key assembly 63. It shows the lower key 64 which has a shear surface 66 and a chamfered edge 72. The lower key 64 is pivotably attached to the lower key carriage 67 by the pivot pin 68. The lower key carriage 67 is releasably attached to the lower assembly base 73 by pins 77 and the adjustment bolt 79 (not shown).

Referring back to FIGS. 2 and 3, the two shear surfaces are spaced from one another by a distance which is less than the width of the sheet 54, and includes a spacing whereby there is slidable contact of the shear surfaces 52 and 62. The path of travel of the shear surfaces 52 and 62 first causes the upper key's shear surface 58 to engage the chamfered edge (not shown) of the lower key 64 and then to confront the lower key's shear surface 66. It will be appreciated that the releasable attachment provided for the upper key 56, the lower key 64, the lower key carriage 67 and the assembly base 73, not only facilitates replaceability should a part wear out or become damaged, but permits rapid interchangeability of the parts with corresponding elements for producing openings of different sizes and of different locations with respect to the container walls.

It is an advantage of the mold in accordance with the invention that the distance between the shear surfaces 52 and 62 is readily controlled. By adjusting the positioning bolt 79, the location of the lower key 64 along an axis perpendicular to the movement of the mold parts 50 and 60, and hence the distance between the upper shear surface 58 and the lower shear surface 66, when they confront to form the latch opening, is simply fixed.

It is another advantage of the invention that the orientation of the shear surfaces 58 and 66 are more readily aligned and stay aligned for longer periods of time than is possible with conventional molds. When prior to a molding operation the mold is slowly closed, keys 56 and 64 self-align. Consequently, the accuracy of the formation of the latch opening 18 is increased and the frequency required for sharpening or replacing the keys is reduced.

Referring now to FIG. 7, there is shown another embodiment of a lower mold part 80 and two adjustable lower key assemblies 85 in accordance with the invention. The mold forms thermoplastic egg cartons with two latch openings in the lid of the cartons. The lower key assemblies 85 are secured to the lower mold 80 by bolts 87, which are slip fit through bores in the assemblies and then threadably secured to the lower mold and by pins 88 (FIG. 9) extending from the lower mold 85 which are press fit into corresponding bores 89 in the lower key assemblies.

Figure 9:
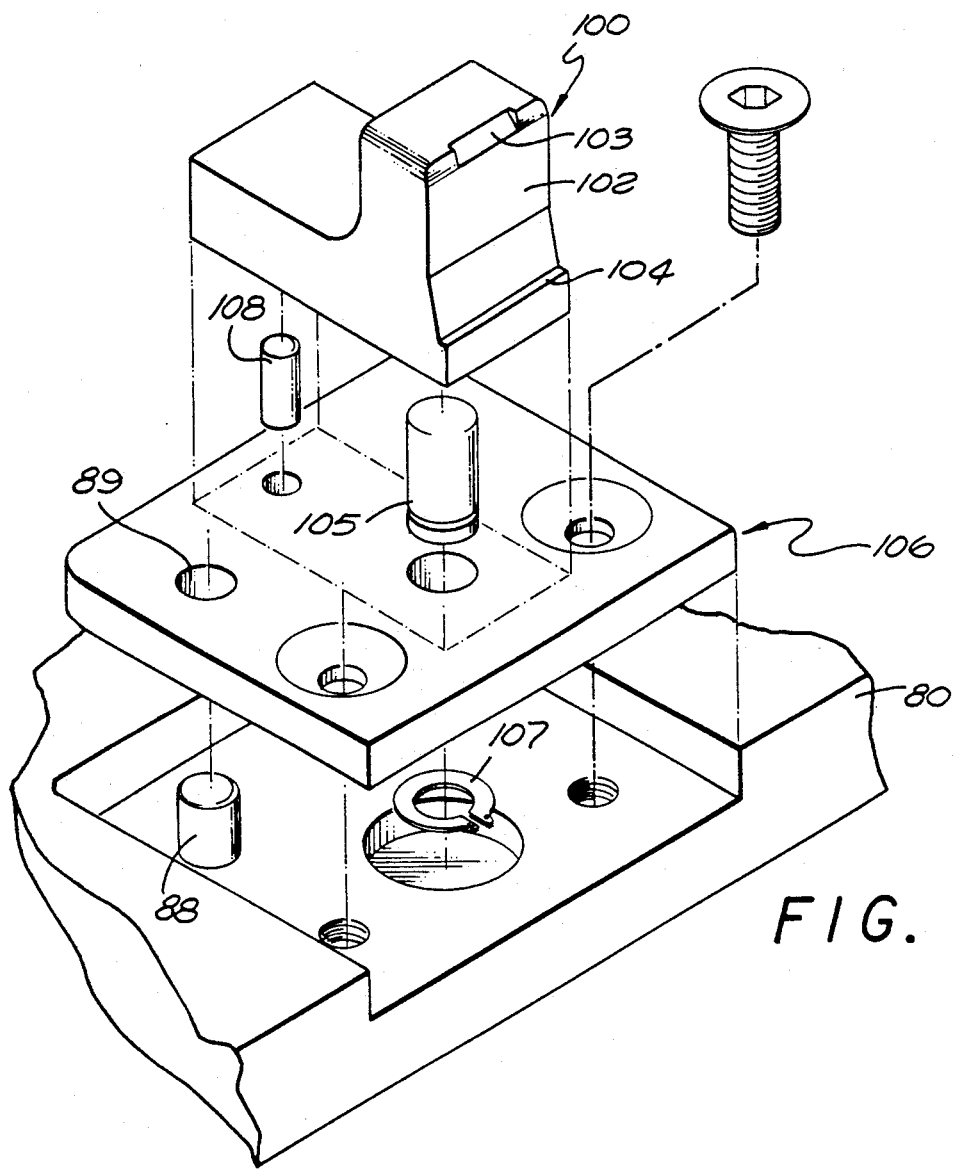
FIG. 9 is an exploded view, of a portion of the lower mold part of FIG. 7, illustrating the adjustable key assembly.

Referring now to FIGS. 8 and 9, there is shown a portion of an upper key 90, the lower mold 80 and associated components. The upper key 90 has a flat shear surface 92 located in a plane parallel to the closing motion of the mold.

A lower key 100 fits into a complimentary hollow chamber 101 of the lower mold 80. The dimensions of the hollow chamber 101 are such that the lower key 100 is free to pivot within a predetermined range of angles.

The lower key 100 has a flat shear surface 102, located in a plane parallel to the plane of the closing motion of the mold. At the top of the shear surface 102 is a chamfered edge 103. The chamfered edge 103 forms a leading edge extending and adjacent the width of the latch opening. Below the shear surface 102, along the path of travel of the mold parts, is a die surface 104.

The lower key 100 is attached by a pivot pin 105 to a lower key carriage 106. The pivot pin 105 is press fit into a bore in the bottom of the lower key 100 and slip fit through a bore in the lower key carriage 106. It is secured to the lower key carriage 106 with a retaining clip 107.

Rotation of the lower key 100 with the pivot pin 105 enables the lower key to pivot on a plane normal to the path of travel of the upper and lower mold parts. The range of angles about which the lower key 100 can pivot is constrained by a retainer pin 108, one end of which is press fit into a second bore in the bottom of the lower key carriage 106 and the other end of which is fit into a retainer pin slot 109 in the bottom of the lower key 100.

Figure 10A:
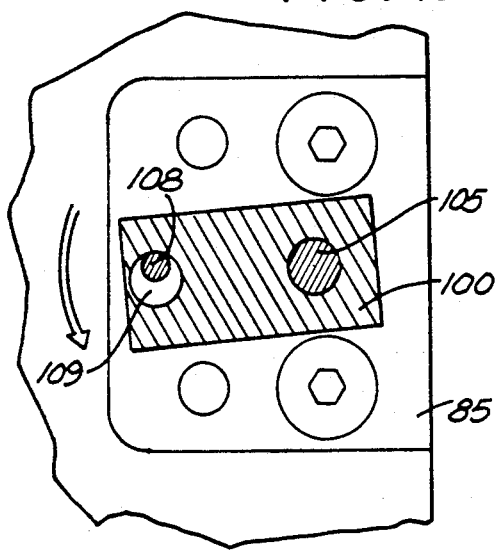
FIGS. 10A and 10B are a top plan views, partially cut-away, of a portion of FIG. 9, illustrating the two extremities of angular rotation of the adjustable key.
Figure 10B:
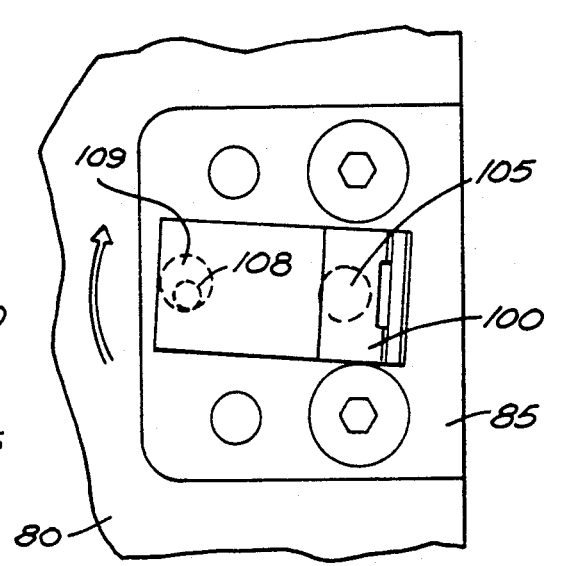

Referring now to FIGS. 10A and 10B there is shown top plan views of the lower mold part 80 and the lower key assembly 85, illustrating the two extremities of angular rotation of the adjustable key 100. The extent to which the lower key 100 can rotate around pivot pin 105 is constrained by the retaining pin 108 and the retaining slot 109.

Figure 11:
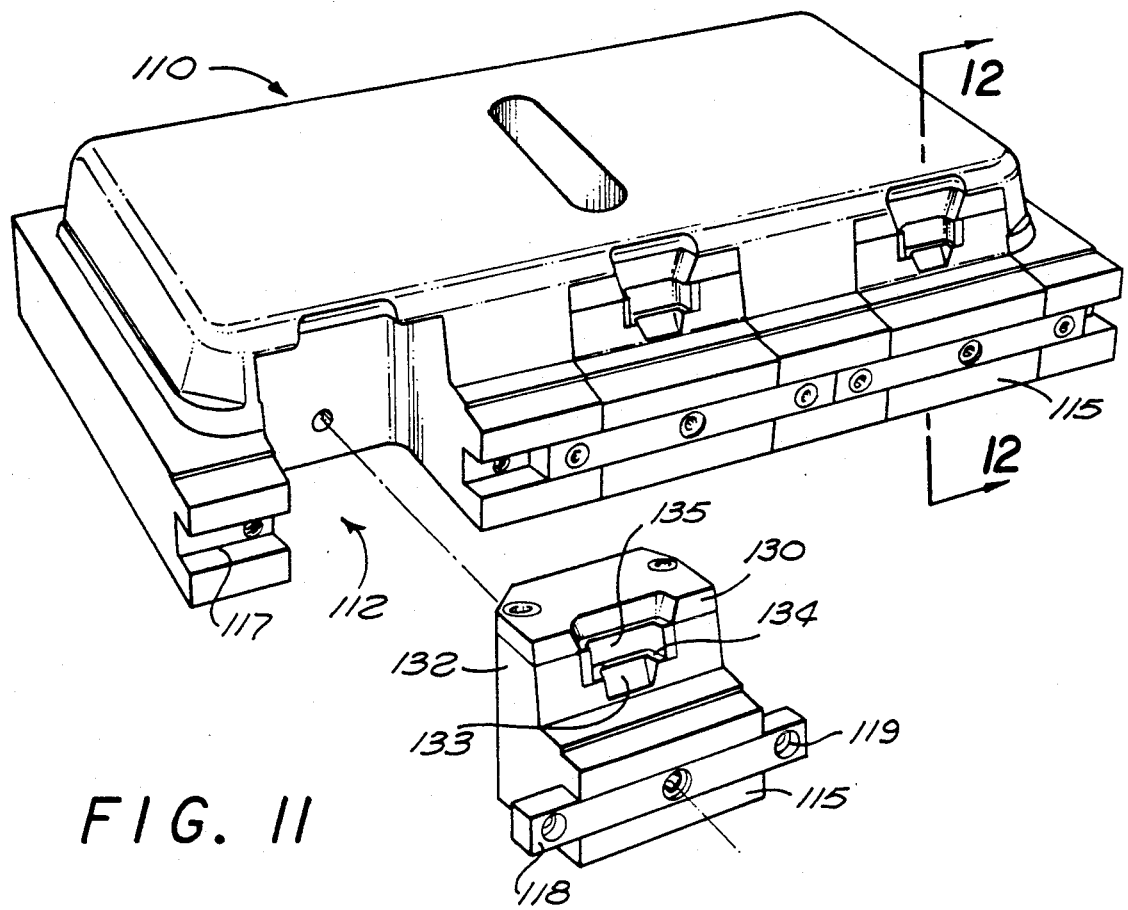
FIG. 11 is a perspective view, partly exploded and cut away, of a lower mold part of another embodiment of a mold in accordance with the invention.

Referring now to FIG. 11, there is shown another embodiment of a lower mold part 110 and adjustable key assemblies 115 in accordance with the invention. The lower mold part 110 forms the lid of a thermoplastic carton and the three lower key assemblies 115 form three latch openings in the lid.

The lower key assemblies 115 are releasably secured into complimentary recesses 112 in the lower mold part 110. The front of the lower key assembly 115 has a fastener slot 116 (FIG. 15) which aligns with a similarly shaped slot 117 in the lower mold part 110, when the lower key assembly is fit in the lower mold recess 112. The lower key assembly 115 is threadably secured to the lower mold part 110 by a fastener bar 118 placed across the fastener slot 116. The fastener bar 118 extends across the fastener slot 116 on each side of the lower key assembly 115. Bolts are inserted through bores 119 in the fastener bar 118 and threadably secured into complimentary bores in the lower mold part 110.

Figure 12:
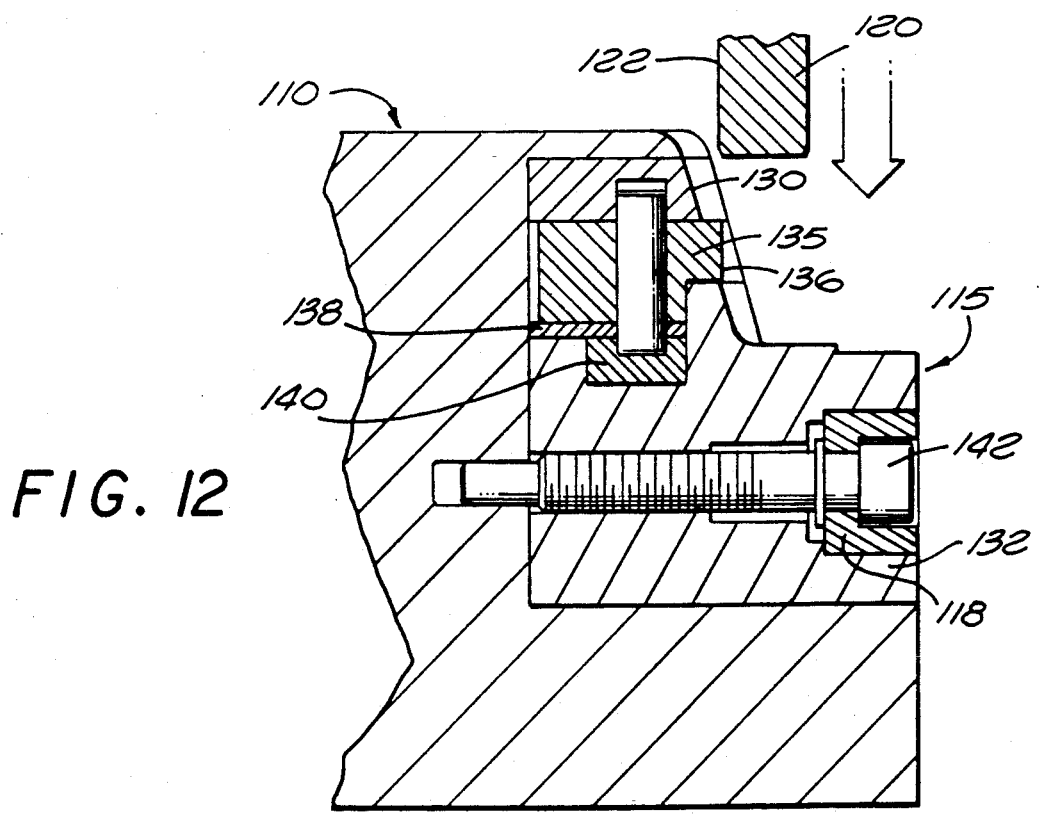
FIG. 12 is a cross-sectional view of a portion of FIG. 11, taken along line 12—12, and of a portion of an upper key.

Additionally referring to FIG. 12, there is shown a portion of an upper key 120, the lower mold part 110 and the adjustable lower key assembly 115. The upper key 120 has a flat shear surface 122 located in a plane parallel to the closing motion of the mold parts.

The lower key assembly has an assembly cover plate 130, the top, back and side surfaces of which fittingly conform to the corresponding top, back and side surfaces of the lower mold recess 112. The contours of the front surface of the assembly cover plate 130 generally conform to the contours of the front surface of the lower mold part 110, except that the front surface of the assembly cover plate has a central region which is relieved on regions spaced on opposite sides from the central region. The regions on opposite sides from the central region are chamfered.

The assembly cover plate 130 is releasably secured to a lower key carriage 132. The bottom, back and side surfaces of the lower key carriage 132 fittingly conform to the corresponding bottom, back and side surfaces of the lower mold recess 112. The contours of the front of the lower key carriage 132 generally conform to the contours of the front of the lower mold part 110, except that the lower key carriage has a recess 133, where excess material, sheared from the thermoplastic sheet when the latch opening is formed, is deposited. The top surface of the recess 133 forms a die surface 134.

A lower key 135 matingly fits into a recess in the top portion of the lower key carriage 132. The lower key 135 has a top surface which is in slidable contact with the bottom surface of the assembly cover plate 130.

The front of the lower key 135 contains a central region which is relieved on regions spaced on opposite sides from the central region. The relieved central region forms a flat shear surface 136, located in a plane parallel to the closing motion of the mold parts. The regions on opposite sides from the central region 136, also form a plane parallel to the closing motion of the mold parts.

A wear bearing 138 is fitted into a second recess in the lower key carriage 132, positioned directly beneath the lower key 135. The front, back and side surfaces of the wear bearing 138 fittingly conform to the corresponding surfaces of the second recess. The bottom surface of the lower key 135t is in slidable contact with the top surface of the wear bearing 138.

An anchor 140 is fitted into a third recess in the lower key carriage 132. The third recess is positioned directly beneath the bottom of the wear bearing 138. The front, back and side surfaces of the anchor 140 fittingly conform to the corresponding surfaces of the third recess. The top surface of the anchor 140 fittingly conforms to the bottom surface of the wear bearing 138.

The adjustable key assembly 115 contains a means for positioning the lower key carriage 132 and the lower key 135, along a line transverse to the path of travel of the mold parts. The location of the lower key carriage 132 and the lower key 135 is adjusted using positioning bolt 142. Positioning bolt 142 is slidably fit through a bore in the fastening bar 118 and secured to the fastening bar with a retaining clip. The bore in the fastening bar 118 is aligned with a threaded bore in the lower key assembly 132, which in turn are both aligned with a bore in the lower mold part 110. The middle portion of the positioning bolt 142 threadably engages the threaded bore in the lower key assembly 132 and the tip of the positioning bolt, which is not threaded, is slidably fit into the a bore in the lower mold part 110. By adjusting the positioning bolt 142, the position of the lower key 135 along an axis perpendicular to the movement of the mold parts, and hence the distance between the shear surfaces 122 and 136, when they confront one another and form the latch opening, is controlled.

Figure 13:
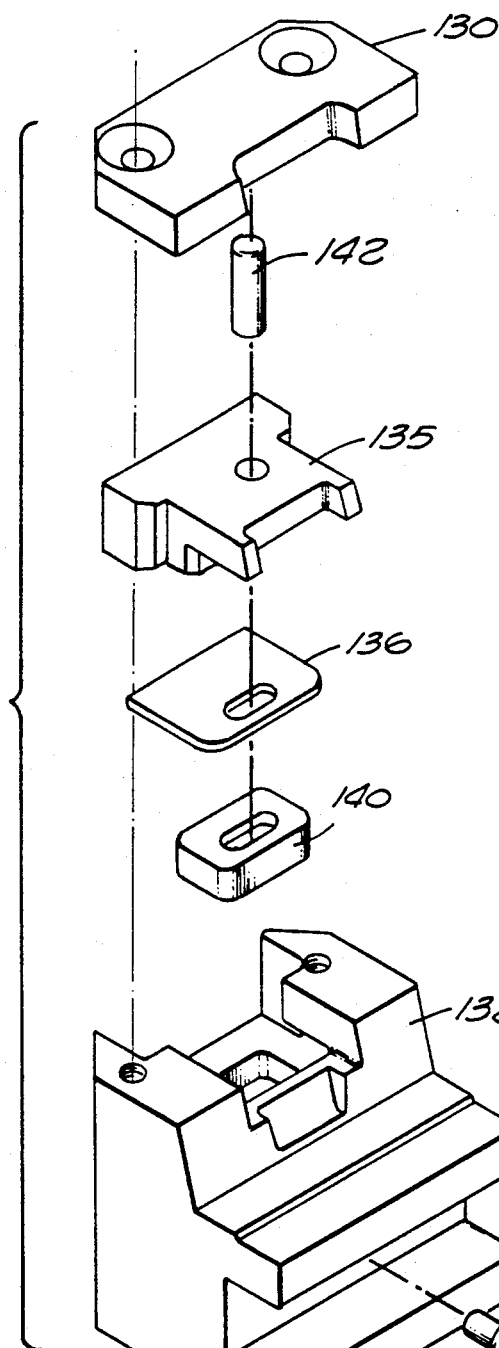
FIG. 13 is a top plan view of the adjustable key assembly of FIG. 11.
Figure 13:
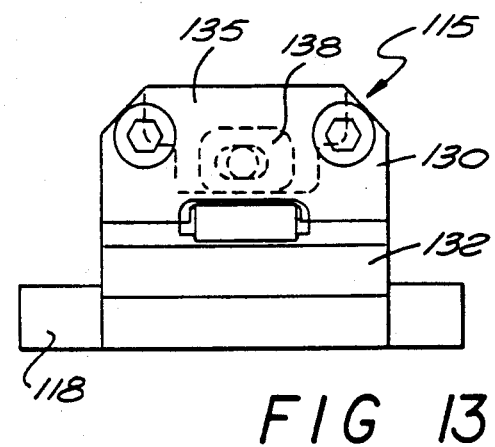

Referring now to FIG. 13, there is shown a top plan view of the adjustable lower key assembly 115. It illustrates fastening bar 118, the lower key assembly cover 130, the lower key carriage 132, the lower key 135 and the anchor 140. The relieved central regions of the lower key assembly cover 130 and the lower key 135 are also seen.

Figure 14:
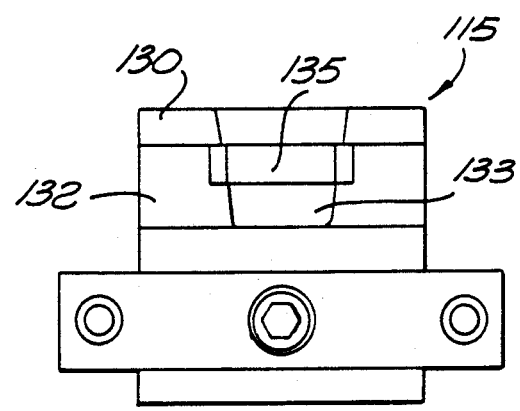
FIG. 14 is a front elevational view of the adjustable key assembly of FIG. 13.

Referring now to FIG. 14, there is shown a front elevational view of the adjustable lower key assembly 115. The conforming relationship between the front surfaces of the lower key assembly cover 130, the lower key 135 and the lower key carriage 132 is seen. In particular, the edges of regions opposite the central relieved region of the lower key assembly cover 130, which are chamfered, the edges of the regions opposite the central relieved region of the lower key 135, which are located in a plane parallel to the motion of closing of the mold parts, and the recess 133 in the front surface of the lower key carriage 132, are illustrated.

Figure 15:
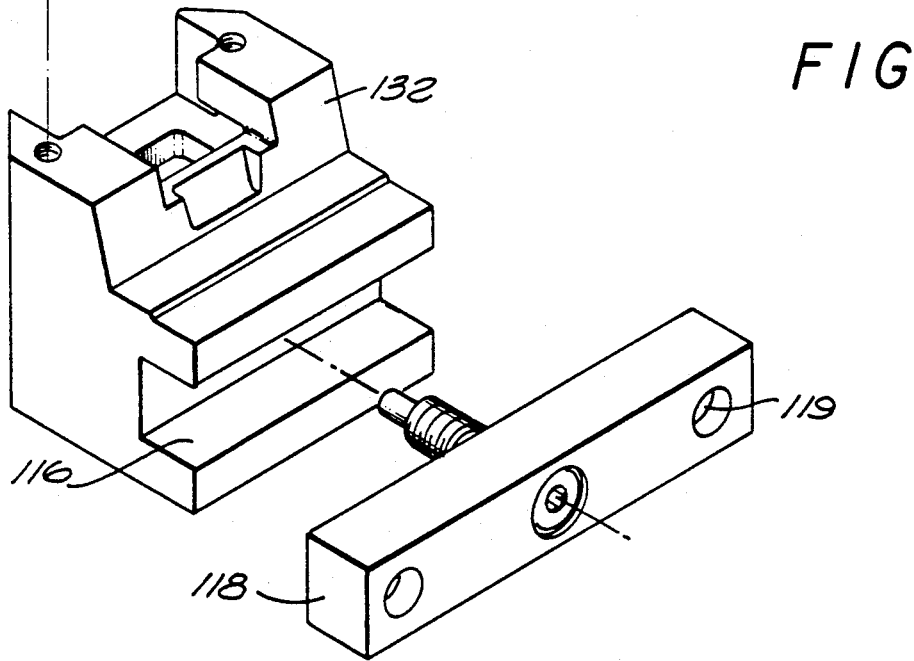
FIG. 15 is an exploded view of the adjustable key assembly of FIG. 13.

Referring now to FIG. 15, means for pivoting the lower key 135, in a plane normal to the motion of closing of the mold parts, are seen. Communicating bores are formed in the lower assembly cover 130, the lower key 135, the wear bearing 136 and the anchor 140. The dimensions of the bores in the lower assembly cover 130, the wear bearing 138 and the anchor 140 are identical. Each is an elongated slot having a width which is substantially the same as the diameter of the pivot pin 142 and a length which is greater than the diameter of the pivot pin. The dimensions of the bore in the lower key 135 is substantially the same as the dimension of the pivot pin 142.

The pivot pin 142 slidably fits into the lower assembly cover bore, the lower key carriage bore and the anchor bore and press fits into the lower key bore. Accordingly, the lower key 135 is free to pivot with pivot pin 142, in a plane normal to the direction of the closing of the mold parts, until the sides of the lower key come into contact with the sides of the lower key carriage 132. The degree of rotation is controlled by the length of a gap between the sides of the lower key 135 and the lower key carriage 132 and by beveling edges of lower key 135 which are parallel to the path of travel of the mold parts.

Further, the lower key is free to make translational movements in the direction of the elongation of the slip fit slots. The extent of the translational movement is controlled by the length of their elongation.

What is claimed is:

1. In a mold for forming a contoured container with an opening having a lower edge from a sheet of deformable material, said mold including
    upper and lower mold parts having die surfaces in conforming relation to one another, shaped to define the contours of said container;
    means for supporting said mold parts, spaced from one another a distance sufficient to permit insertion of said sheet between said mold parts;
    means for closing said mold parts toward one another along a path of travel to form said container; and
    upper and lower keys mounted in said upper and lower mold parts, respectively, where said keys have flat shear surfaces, and where said keys are mounted so that said shear surfaces confront each other to form said opening as said mold parts close,
    where the improvement comprises at least one of said keys is mounted so that its shear surface pivots on a plane normal to said path of travel.

2. The mold according to claim 1, wherein said shear surface of said pivotable key has a central region and said shear surface is relieved on regions spaced on opposite sides from said central region.

3. The mold according to claim 2, wherein said regions spaced on opposite sides from said central region are chamfered.

4. The mold according to claim 1, wherein said shear surfaces confront each other in a plane parallel to said path of travel to form said opening.

5. The mold according to claim 1, wherein said lower key is pivotable.

6. The mold according to claim 5, further comprising said shear surface of said lower key has a leading edge extending and adjacent the lower edge of said opening.

7. The mold according to claim 6, wherein said leading edge is chamfered.

8. The mold according to claim 5, further comprising said upper key has a leading edge extending and adjacent the lower edge of said opening and said leading edge of said upper key is chamfered.

9. The mold according to claim 1, further comprising means for constraining rotation of said pivotable key to a preselected range.

* * * * *